(12) United States Patent
Liang (10) Patent No.: US 12,326,826 B1
(45) Date of Patent: Jun. 10, 2025

(54) HOT-SWAPPABLE STRUCTURE OF CONNECTOR AND METHOD THEREOF

(71) Applicant: Hsien-Rong Liang, New Taipei (TW)

(72) Inventor: Hsien-Rong Liang, New Taipei (TW)

( * ) Notice: Subject to any disclaimer, the term of this patent is extended or adjusted under 35 U.S.C. 154(b) by 0 days.

(21) Appl. No.: 18/522,175

(22) Filed: Nov. 28, 2023

(51) Int. Cl.
*G06F 13/40* (2006.01)
*G06F 13/42* (2006.01)

(52) U.S. Cl.
CPC ...... *G06F 13/4081* (2013.01); *G06F 13/4221* (2013.01); *G06F 2213/0026* (2013.01)

(58) Field of Classification Search
None
See application file for complete search history.

(56) References Cited

U.S. PATENT DOCUMENTS

| 10,359,815 B1 * | 7/2019 | Lin | H01R 12/721 |
| 2019/0095774 A1 * | 3/2019 | Ping | H05K 1/18 |
| 2023/0047735 A1 * | 2/2023 | Wang | G06F 13/382 |

* cited by examiner

*Primary Examiner* — Tim T Vo
*Assistant Examiner* — Dayton Lewis-Taylor
(74) *Attorney, Agent, or Firm* — Leong C. Lei (57) ABSTRACT

A hot-swappable structure of a connector and a method thereof are provided. When a swapping device is plugged into PCIe, a swapping detection module detects the swapping operation and a recognition module reads an electrical signal of the plugging of the swapping device to be compared with positive/negative trigger data of a chip database by means of a comparison module. If the comparison is matched, a privilege control module issues a control signal including delay interval length data; and if the comparison is not matched, a universal control section generates a universal signal including universal delay time data. A chip resetting module may issue, according to the control signal or the universal signal, a resetting request to a control system for upgrading to a how swapping request of a processing chip of the connector. The control system selects one hot-swapping control module that meet the specification of the swapping device.

15 Claims, 11 Drawing Sheets

HOT-SWAPPABLE STRUCTURE OF CONNECTOR AND METHOD THEREOF

BACKGROUND OF THE INVENTION

(a) Technical Field of the Invention

The present invention provides a hot-swappable structure of a connector, and a method thereof, which implements resetting of a connector processing chip by means of a design of hardware or firmware, so as to upgrade privilege of hot-swapping operation to realize a hot-swapping function thereof with Peripheral Component Interconnect Express (PCIe).

(b) Description of the Prior Art

Universal Serial Bus 4 (USB4) and Thunderbolt are getting increasingly popular in the current mainframe platform market. Thunderbolt and USB4 are different from the prior USB protocol standards. Thunderbolt and USB4 require use of the USB-C connector and USB power delivery (PD) for supply of electricity, and, compared to USB3.2, they allow tunneling of DisplayPort and PCIe. This architecture defines a method for sharing a single high-speed link with multiple hardware endpoints dynamically and may support 40 Gbit/s or higher throughput, higher than USB3.2. Thunderbolt is a connector standard developed by Intel and Apple for connection of external peripherals to a computer, having a minimum bandwidth requirement of 32 Gbit/s for PCIe link and supporting for dual 4K displays (DisplayPort 1.4) and supporting Intel VT-d based direct memory access protection (quoted from Wikipedia USB4 and Thunderbolt).

However, USB4 or Thunderbolt suffers the following defects for operation thereof, and requires further improvement:

Firstly, the system supporting management of PCIe devices limits the hot-swappability of PCIe storage medium with respect to USB4 and Thunderbolt, so that making connection to USB4 and Thunderbolt must reactivate the entire system to reset electricity supplying to USB4 and Thunderbolt devices.

Secondly, hot-swapping currently available for PCIe is achieved by assigning a delay time to activation or by resetting device main IC power supply. However, due to the high transmission rate of PCIe, detection of a plugging operation of a connector is generally retry impossible for second-time delay or resetting power supply. Consequently, the power supply has to be reactivated or the plugging operation of the connector be re-performed if failure occurs, and particularly, plugging communication of PCIe is unstable and it is not possible to achieve 100% successful hot-swapping.

Thirdly, due to multiplexing, it often needs to design a system with multiple connection ports, and once one of the multiple connection ports is kept in an operating state, it is not possible to carry out a resetting operation on any one of the connection ports.

SUMMARY OF THE INVENTION

In view of above deficiency, the present invention aims to provide a hot-swappable structure of a connector, and a method thereof, which implements resetting of a connector processing chip by means of a design of hardware or firmware, so as to upgrade privilege of hot-swapping operation to realize a hot-swapping function thereof with Peripheral Component Interconnect Express (PCIe).

The primary objective of the present invention to utilize an arrangement of a universal control section, a chip database, and hot-swapping control modules to provide a processing chip of a connector with an optimum resetting time so as to allow for 100% success of hot swapping.

To achieve the above objectives, the present invention provides a connector connectable with a high-speed transmission interface, and the connector is provided with Peripheral Component Interconnect Express (PCIe) in information connection therewith and generates an electrical signal upon connecting with a swapping device. The hot-swappable structure mainly comprises: a chip database, a swapping detection module, a recognition module, a comparison module, a privilege control module, a universal control section, a chip resetting module, and a plurality of hot-swapping control modules. The chip database is arranged at one side of the high-speed transmission interface. The swapping detection module is arranged at one side of the high-speed transmission interface and is operable to detect a swapping operation of the swapping device with respect to the PCIe. The recognition module is in electrical connection with the swapping detection module and the chip database. The comparison module is arranged in the recognition module. The privilege control module is arranged in the connector and is in electrical connection with the comparison module and the chip database. The universal control section is arranged in the privilege control module. The chip resetting module is arranged at one side of the privilege control module and is in information connection with a control system. The hot-swapping control modules are arranged at one side of the high-speed transmission interface and are in information connection with the chip resetting module.

When a user plugs a swapping device into the PCIe, the swapping detection module detects the swapping operation to generate a plugging signal, and the recognition module, upon receiving the plugging signal, reads an electrical signal generated by the plugging of the swapping device to have the comparison module compare the electrical signal with positive/negative trigger data stored in the chip database, so that when the comparison is matched, the privilege control module issues a control signal including delay interval length data corresponding to the specification of the swapping device, and when the comparison is not matched, the universal control section generates a universal signal including universal delay time data to have the chip resetting module issue a resetting request to the control system according to the control signal or the universal signal to allow low swapping operation privilege of the swapping device to upgrade to high hot-swapping request of the processing chip of the connector, and the control system selects the hot-swapping control module meeting the specification of the swapping device to realize plug-and-play of the swapping device in a USB4 or Thunderbolt connector.

Based on the above technology, the deficiency of the prior USB4 or Thunderbolt not supporting hot swapping and hot swapping with respect to PCIe being not of 100% success can be overcome to achieve the above-described advantages.

DETAILED DESCRIPTION OF THE PREFERRED EMBODIMENTS

Referring to FIGS. 1-6, which are respectively a perspective view of a preferred embodiment of the present invention to a third flow chart of operation blocks, it is clearly seen from the drawings that a connector 1 according to the present invention is provided for connection with a high-speed transmission interface 21, and the connector 1 is provided with Peripheral Component Interconnect Express (PCIe) 11 in information connection therewith and generating an electrical signal when connected with a swapping device 9, and the hot-swappable structure mainly comprises:

a chip database 3, which is arranged at one side of the high-speed transmission interface 21 and is provided to store positive/negative trigger data 31, delay interval length data 32, and the universal delay time data 33 corresponding to the specification of the swapping device 9;

a swapping detection module 211, which is arranged at one side of the high-speed transmission interface 21 and is provided to detect a swapping operation of the swapping device 9 with respect to the PCIe 11 to generate a plugging signal;

a recognition module 4, which is in electrical connection with the swapping detection module 211 and the chip database 3 and is operable to read the electrical signal upon receiving the plugging signal;

a comparison module 41, which is arranged in the recognition module 4 and is operable to compare the electrical signal with the positive/negative trigger data 31;

a privilege control module 5, which is arranged in the connector 1 and is in electrical connection with the comparison module 41 and the chip database 3, and is operable to generate a control signal that includes the plugging signal and the delay interval length data 32 when a comparison result of the comparison module 41 is "matched";

a universal control section 51, which is arranged in the privilege control module 5 and is operable to generate a universal signal that includes the plugging signal and the universal delay time data 33 when the comparison result of the comparison module 41 is "not matched";

a chip resetting module 6, which is arranged at one side of the privilege control module 5 and is in information connection with a control system 2, and is operable to issue a resetting request 61 that includes the control signal or the universal signal to the control system 2 upon receiving the control signal or the universal signal; and a plurality of hot-swapping control modules 7, which are arranged at one side of the high-speed transmission interface 21 and are in information connection with the chip resetting module 6, wherein the control system 2 selects, according to the resetting request 61, one of the hot-swapping control modules 7 to be conducting with the high-speed transmission interface 21.

Figure 1:
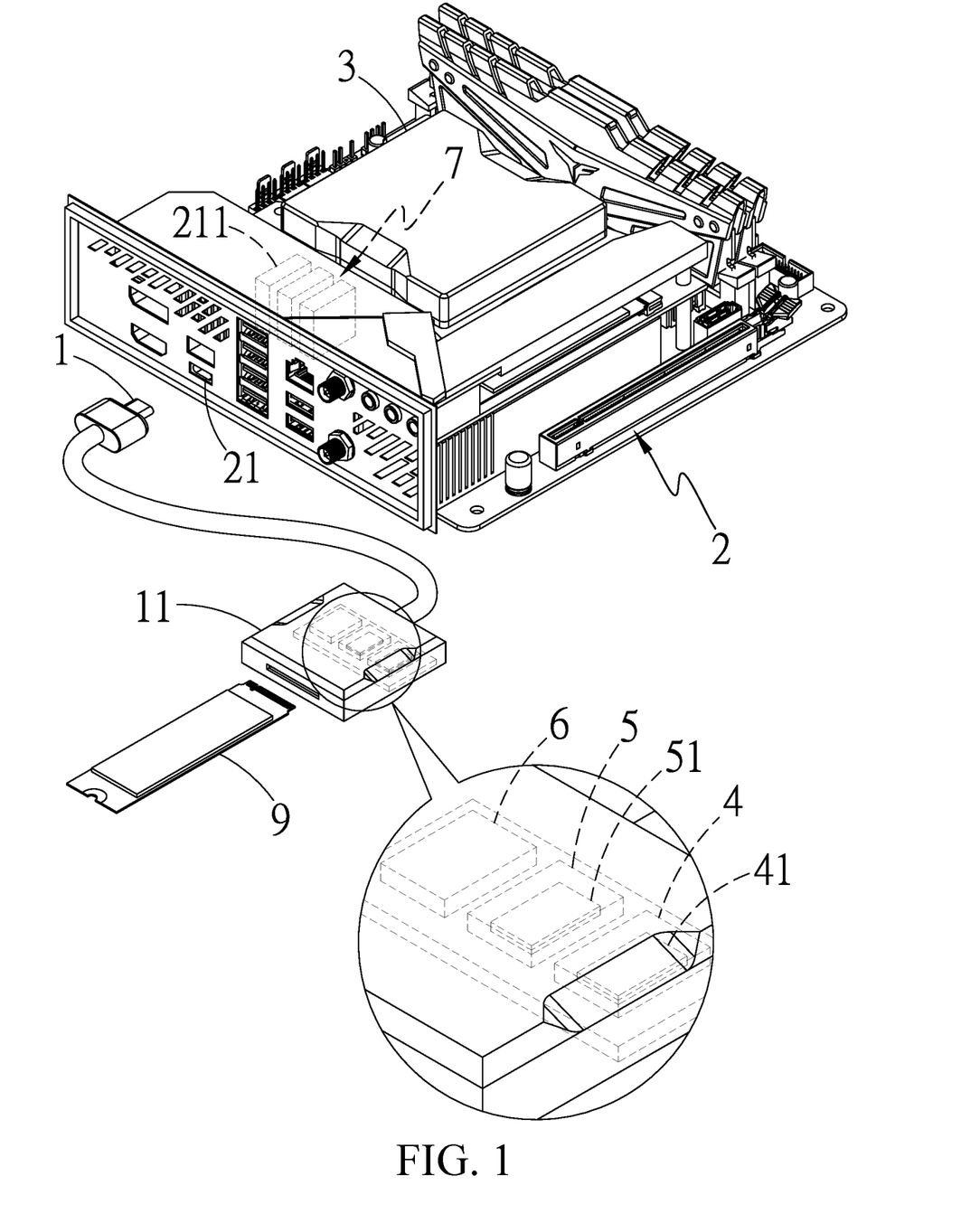
FIG. 1 is a perspective view showing a preferred embodiment of the present invention.
Figure 2:
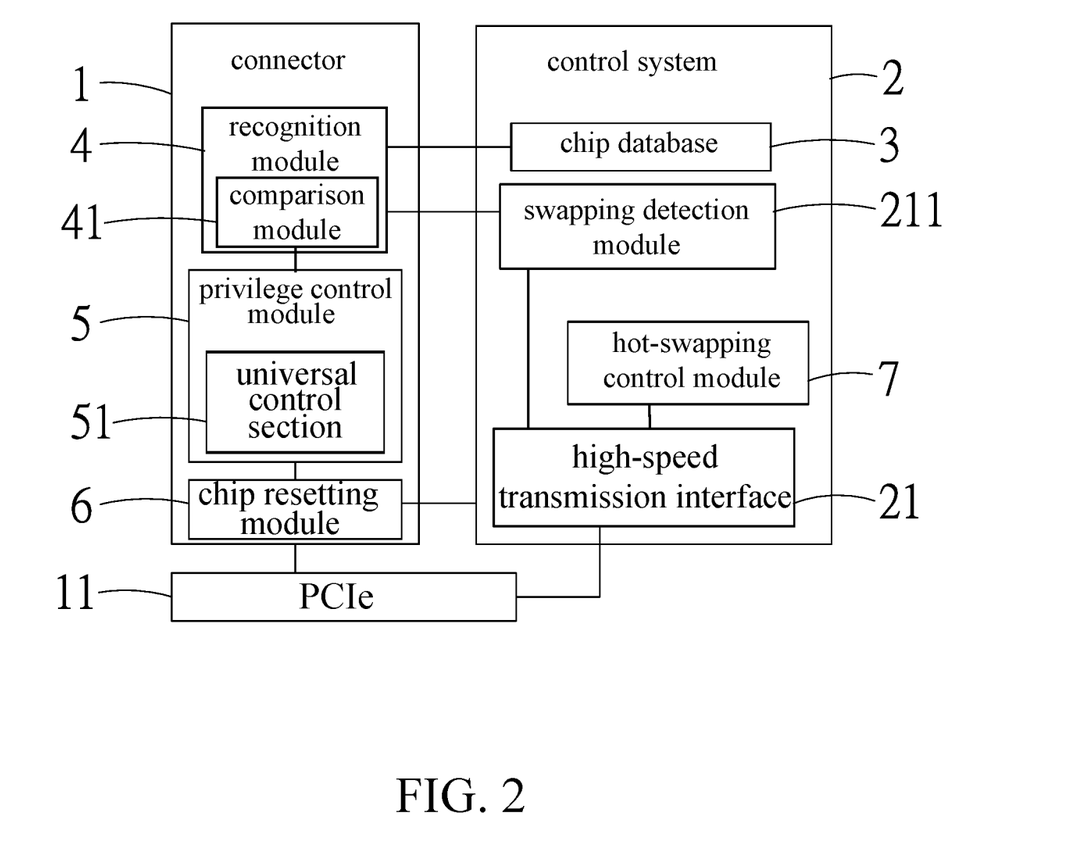
FIG. 2 is a structure block diagram of the preferred embodiment of the present invention.
Figure 3:
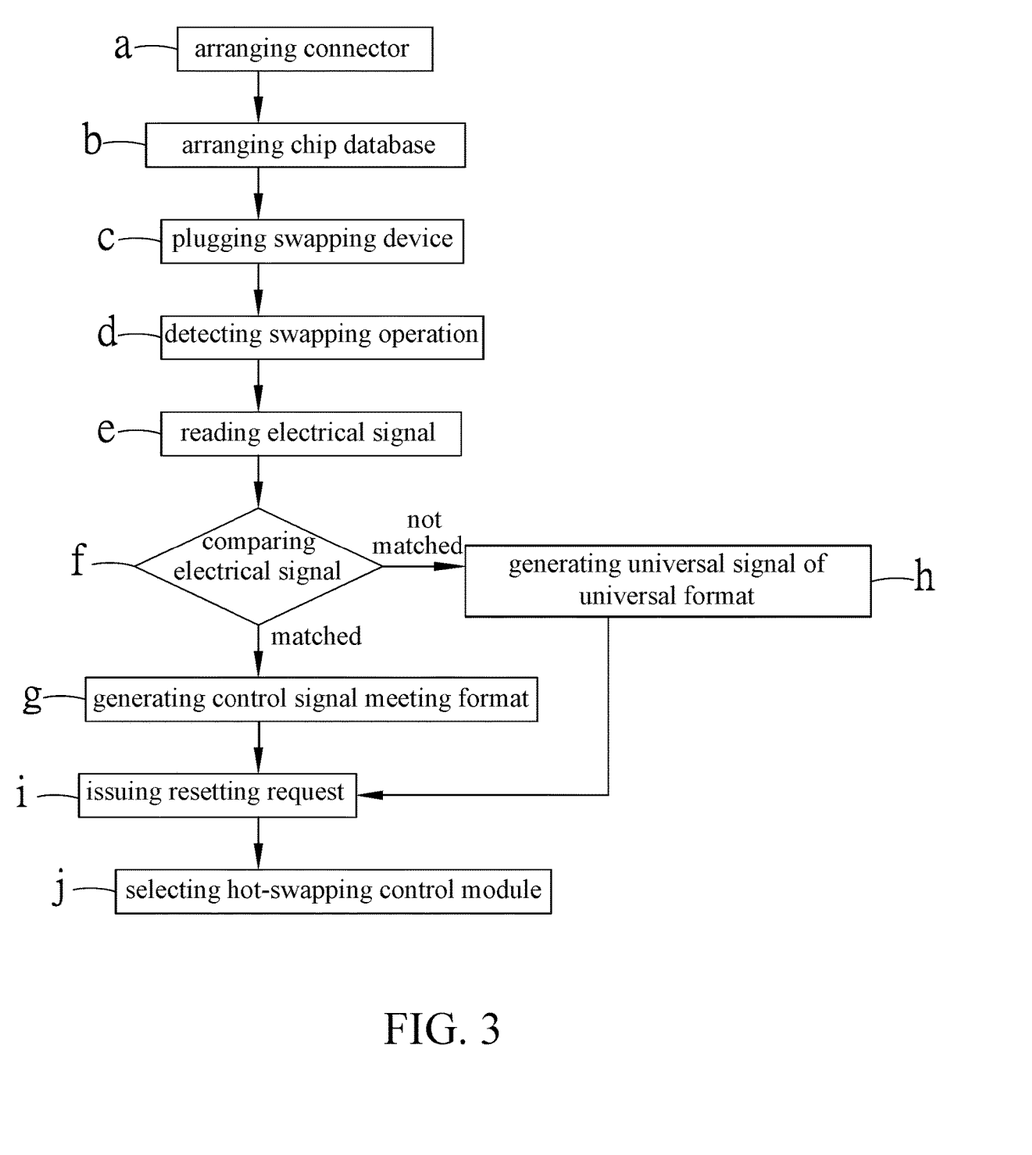
FIG. 3 is a flow chart of steps of the preferred embodiment of the present invention.
Figure 4:
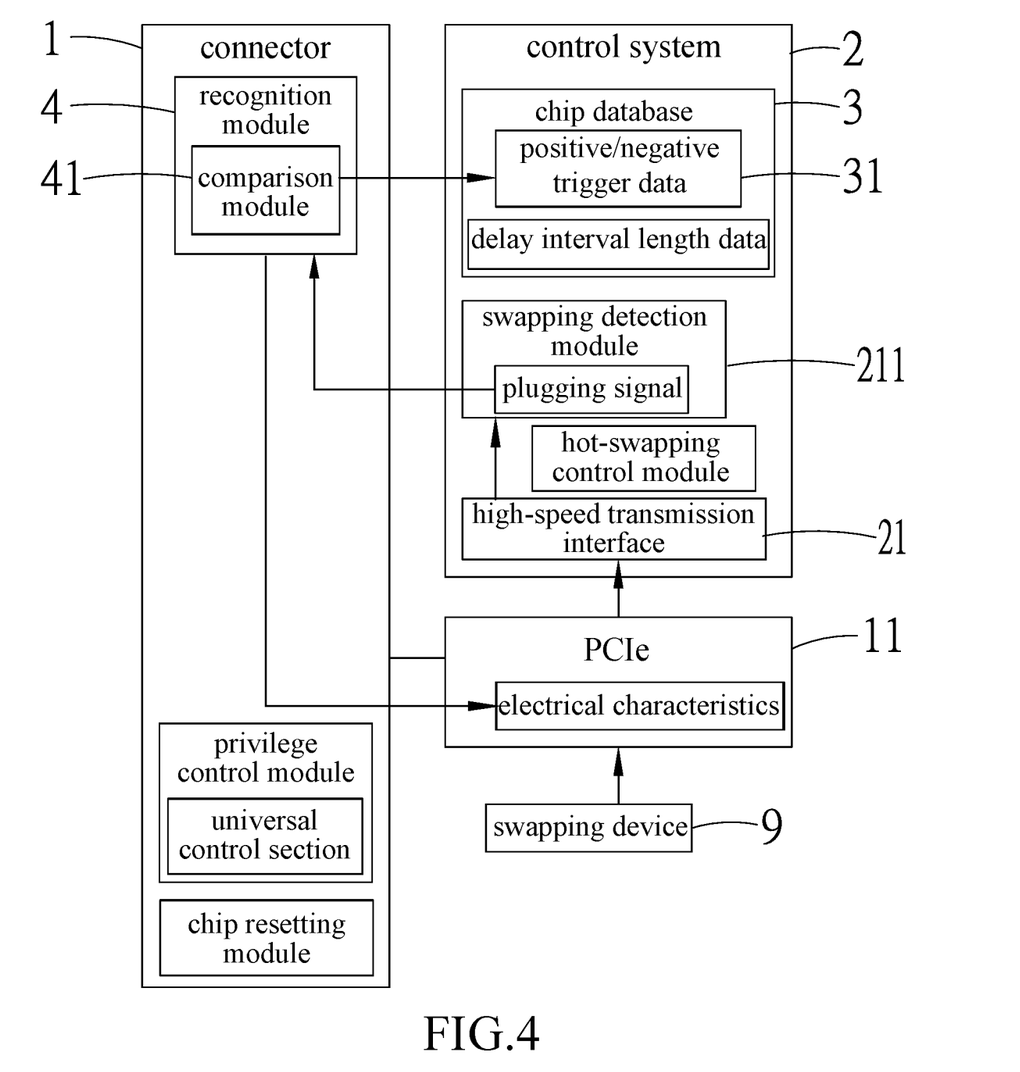
FIG. 4 is a first flow chart of operation blocks of the preferred embodiment of the present invention.
Figure 5:
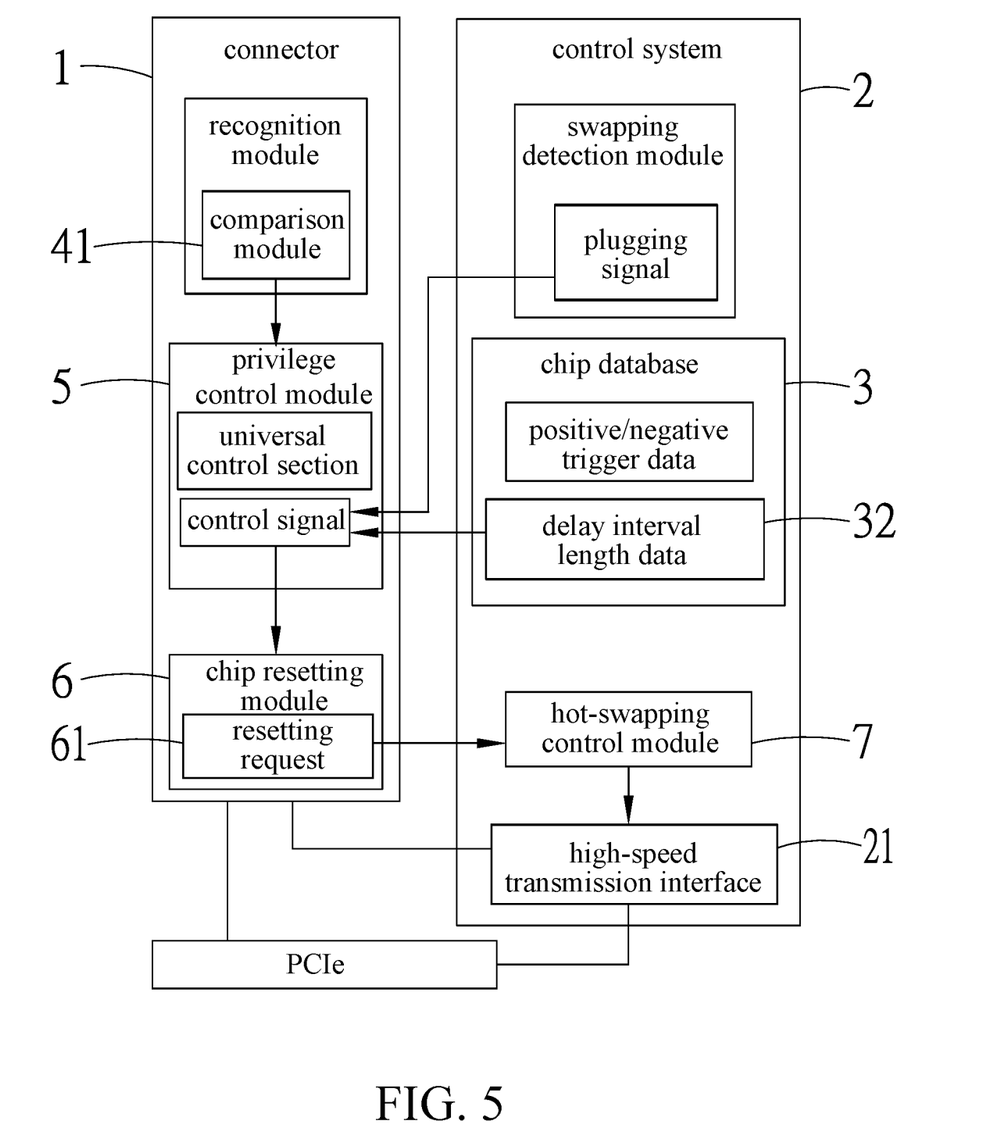
FIG. 5 is a second flow chart of operation blocks of the preferred embodiment of the present invention.
Figure 6:
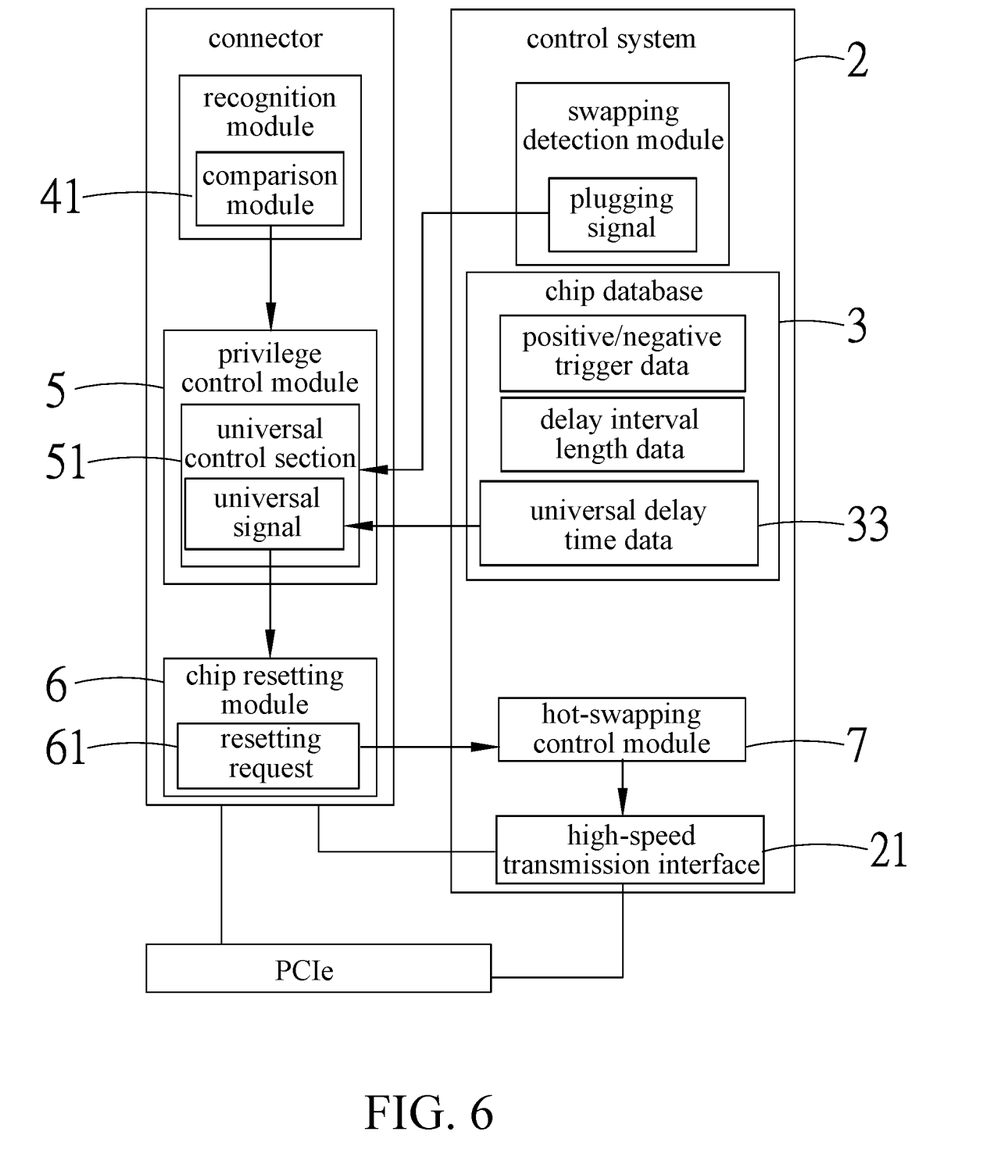
FIG. 6 is a third flow chart of operation blocks of the preferred embodiment of the present invention.

A connector hot-swapping method according to the present invention is such that a connector 1 is provided with Peripheral Component Interconnect Express (PCIe) 11 in information connection therewith, and main steps of the hot-swapping method include:

(a) arranging a connector: connecting the connector 1 with a high-speed transmission interface 21;

(b) arranging a chip database: storing positive/negative trigger data 31, delay interval length data 32, and universal delay time data 33 corresponding to specifications of a plurality of swapping devices 9 in a chip database 3 arranged at one side of the high-speed transmission interface 21;

(c) plugging a swapping device: a user connecting one of the swapping devices 9 with the PCIe 11 and generating an electrical signal;

(d) detecting a swapping operation: a swapping detection module 211 detecting the swapping operation implemented between the swapping device 9 and the PCIe 11 and generating a plugging signal;

(e) reading the electrical signal: a recognition module 4 reading the electrical signal when the recognition module 4 receives the plugging signal;

(f) comparing the electrical signal: a comparison module 41 in the recognition module 4 comparing the electrical signal with the positive/negative trigger data 31, and going on to Step (g) when a comparison result is "matched", and going on to Step (h) when the comparison result is "not matched";

(g) generating a control signal meeting a format: a privilege control module 5 generating the control signal that includes the plugging signal and the delay interval length data 32, and going on to Step (i);

(h) generating a universal signal of a universal format: a universal control section 51 arranged in the privilege control module 5 generating the universal signal that includes the plugging signal and the universal delay time data 33;

(i) issuing a resetting request: a chip resetting module 6 receiving the control signal or the universal signal and issuing a resetting request that includes the control signal or the universal signal to a control system 2; and (j) making selection among hot-swapping control modules: the control system 2 selecting, according to the resetting request, one of the plurality of hot-swapping control modules 7 that meets the specification of the swapping device 9 to be conducting with the high-speed transmission interface 21.

The connector 1 meets the specification of one of USB4 and Thunderbolt. The high-speed transmission interface 21 comprises a socket corresponding to the connector 1 and is the only connection port at one side of the control system 2 that is convertible with the PCIe 11. The chip database 3 may comprise a storage interface of for example a memory or a hard disk drive. The swapping detection module 211 applies a mechanical structure, such as spring snap fastening, or a circuit arrangement that is operative with a detection pin of the swapping device 9 to carry out detection. The recognition module 4, the comparison module 41, the privilege control module 5, the universal control section 51, and the chip resetting module 6 are electronic components, such as processors and transistors on a circuit board, and the circuit board can be integrated with the PCIe 11 or can be integrated with a circuit board in the connector 1, and the former is taken as an example for illustration in the instant embodiment. The hot-swapping control modules 7 are block circuits on a circuit board. The swapping device 9 is a solid state drive (SSD). However, the configuration corresponding to the above elements is provided as an example of the preferred embodiment, and configurations showing the same functionality all belong to the scope of the present invention, not limited to what given above in the illustrative examples.

Based on the above description, the structure of the technology can be understood, and based on corresponding combination of the structure, resetting of a processing chip the connector 1 can be implemented by means of a design of hardware or firmware, so as to upgrade privilege of hot-swapping operation to achieve an advantage of hot-swapping with the PCIe 2.

Firstly, it is clearly seen in Step (a) and the drawings, the high-speed transmission interface 21 is a socket that complies with USB4 or Thunderbolt, the two being compatible to USB3, DisplayPort, PCIe tunneling, so as to usable for connection with a portable disk, an external hard disk drive, a card reader, and even an external graphics card, and the high-speed transmission interface 21, even being a sole connection port at one side of the control system 2, is capable of handling all sorts of external connection, and the high-speed transmission interface 21, serving as the sole connection port of the control system 2, surely has very high handling privilege so that a request from the high-speed transmission interface 21 can have more stable communication and is not easily interfered with.

Next, in Step (b), to upgrade a low swapping privilege of the swapping device 9 to a hot-swapping request of the processing chip of the connector 1, it needs to have the high-speed transmission interface 21 more completely collect data of the swapping device 9, including the generally recognized format, specification, standard, specifics, and details (namely specification, which is also referred to as spec), and for the purpose of hot-swapping, it needs to further identify the time length for resetting the processing chip of the connector 1 for re-setting up power supply (including parameters of voltage, current, and power). Since the swapping devices 9 available in the market are of different specifications, and study and research made in advance help obtain such data for being recorded in the chip database 3. When a known swapping device 9 is inserted, the above-discussed handling privilege in combination with the action of collecting complete data allowing for realizing 100% successful insertion of the swapping device 9.

In practical uses, in Step (c) to Step (e), when the swapping device 9 is inserted into the PCIe 11, the swapping detection module 211 uses the connector 1 to detect the swapping operation to generate a plugging signal, and after the recognition module 4 receives the plugging signal, the electrical signal generated when the swapping device 9 is inserted is read to allow the comparison module 41 to compare the electrical signal with the positive/negative trigger data 31 loaded in the chip database 3, and such a comparison operation helps identify if the specification of the swapping device 9 is known. Since the PCIe 11 can only receive signals and is incapable of transmitting a signal or feeding back a signal, a minor difference in the positive/negative trigger data 31 of each swapping device 9 can be used for distinction and identification, such as voltage value being 1.05V or 1.92V.

In Step (f) to Step (j), if the comparison result of the comparison module 41 is "matched", the privilege control module 5 issues a control signal including the plugging signal and the delay interval length data 32 that corresponds to the specification of the swapping device 9, and the chip resetting module 6, upon receiving the control signal, issues a resetting request 61 to the control system 2 according to the control signal, and in this way, the low swapping privilege of the swapping device 9 is upgraded to a hot-swapping request of the processing chip of the connector 1; and if the comparison result is "not matched", the universal control section 51 reads the universal delay time data 33 in the chip database 3 to generate a universal signal including a universal plugging signal and the universal delay time data 33 so that the chip resetting module 6 may issue a resetting request 61 to the control system 2 according to the universal signal to similarly achieve the effect of privilege upgrading, and finally, the control system 2 selects the hot-swapping control module 7 that meets the specification of the swapping device 9 to realize plug-and-play of the swapping device 9 in USB4 or Thunderbolt connector 1.

A difference between the control signal and the universal signal is that the delay interval length data 32 of the control signal is a time length that is pre-set for a known swapping device 9 and the operation can be fast completed, and in making selection among the hot-swapping control modules 7, the control system 2 may select a dedicated or a suitable hot-swapping control module 7 according to complete information in the chip database 3, and hot swapping can be implemented in a more efficient and safer way. As to the universal signal, because the inserted swapping device 9 is not included in the chip database 3, it is only possible to do trial-and-error one by one among multiple hot-swapping control modules 7, and at time moment, due to the arrangement of single high-speed transmission interface 21, to try resetting the processing chip of the connector 1 with different data, it does not need to consider if the other connection ports are being in use, and such a trial operation is carried out in the level of the high-speed transmission interface 21 and has not been yet up-transmitted to the level of the control system 2, and is not constrained by high speed operation and being impossible for trial of resetting power supply of PCIe. In other words, it only needs to load one set of universal delay time data 33 in the chip database 3 to provide sufficient time for all the processing chips to implement hot swapping. In the instant embodiment, the delay interval length data 32 is 0 ms to 500 ms, and the universal delay time data 33 is 1 second to 2 seconds.

Figure 7:
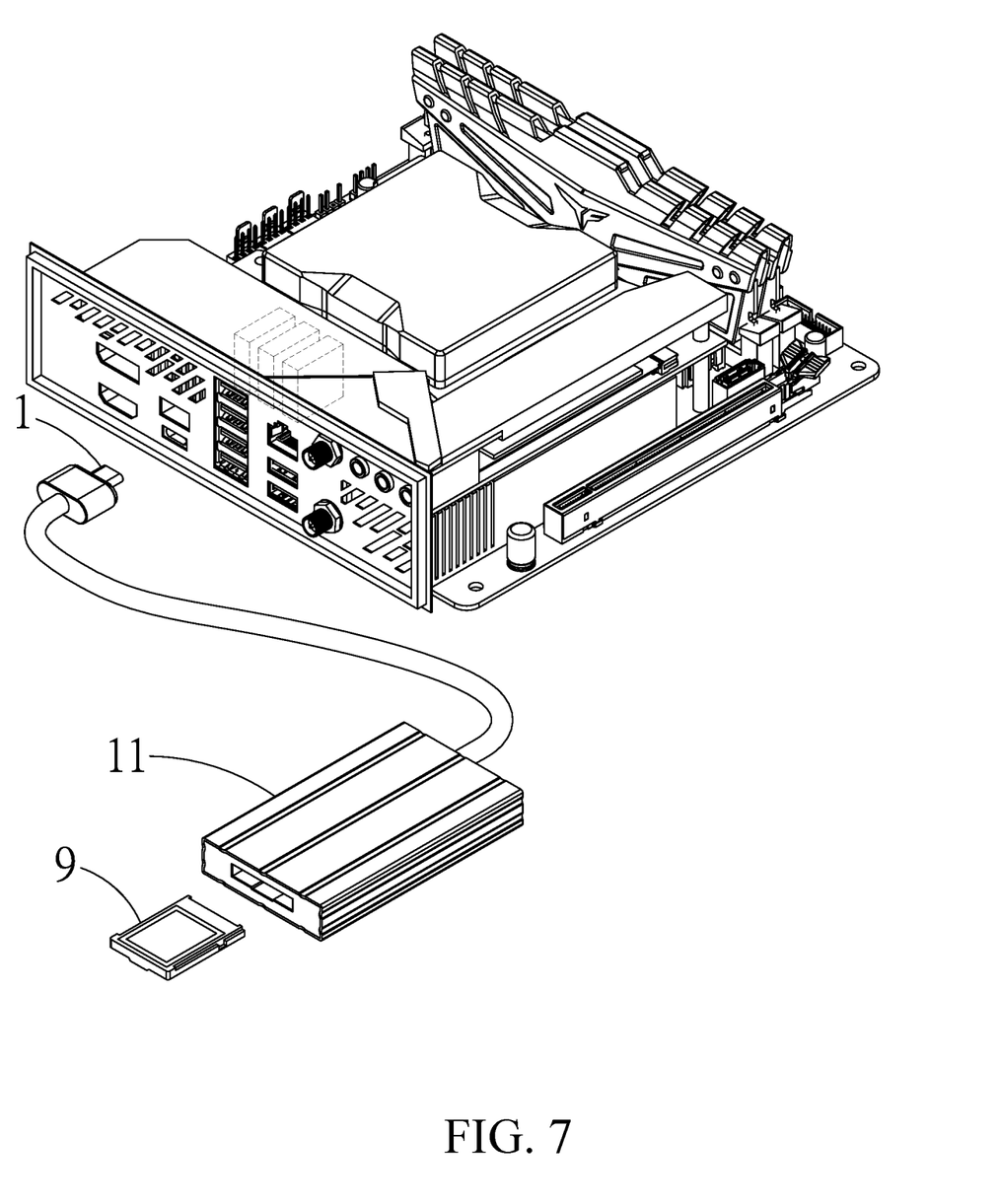
FIG. 7 is a perspective view showing another preferred embodiment of the present invention.

Referring to FIG. 7, which is a perspective view showing another preferred embodiment of the present invention, it is clearly seen from the drawing that the instant embodiment is similar to the previous embodiment and in the instant embodiment, the swapping device 9 is an M.2 SSD memory card. M.2 is the specification for external sizes and electrical interface of pins of computer internal expansion card and related connectors, adopting whole new physical layout and connector, and theoretic transmission rate can be as high as more than 40 Gbit/s, and the PCIe 11 is in the form of an external connection box for the USB4 or Thunderbolt connector 1. This provides that the present invention also supports hot swapping of M.2 SSD memory card.

Figure 8:
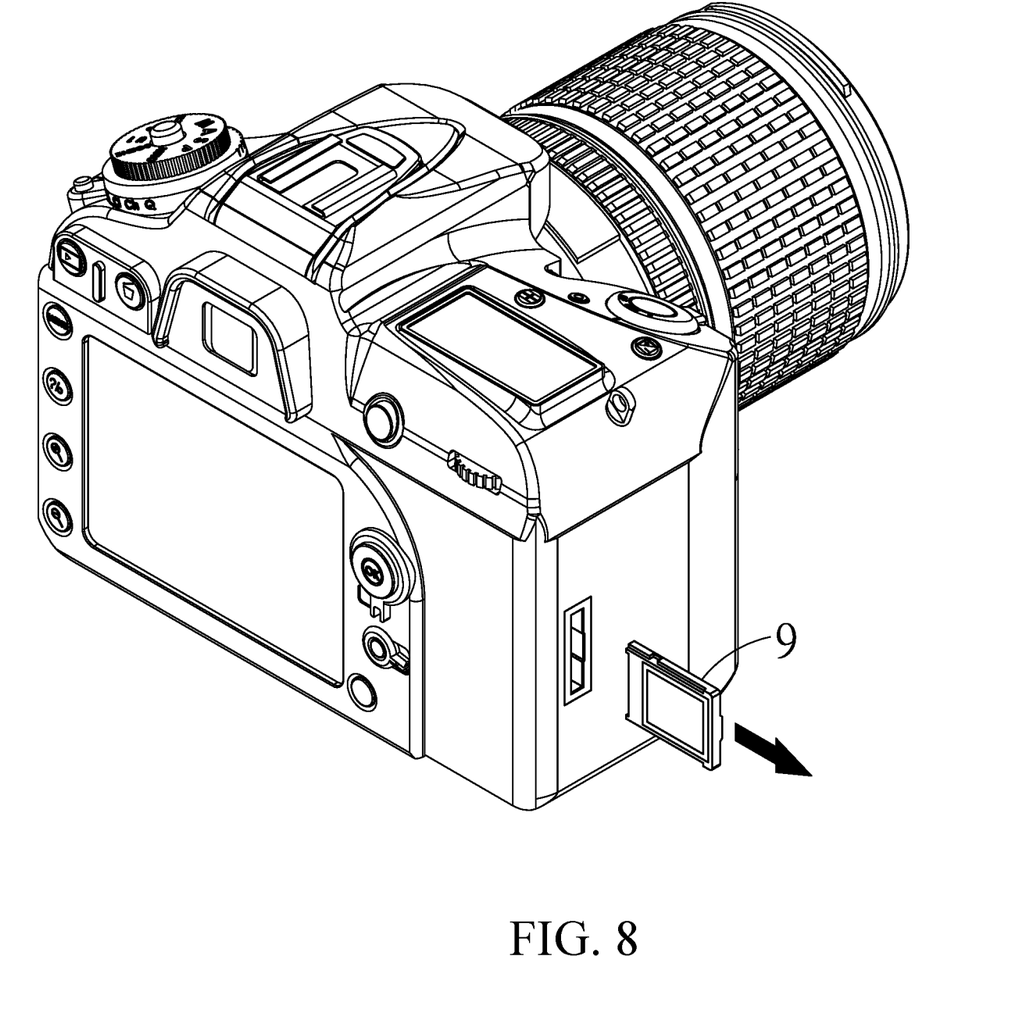
FIG. 8 is a first schematic view showing implementation of a further preferred embodiment of the present invention.
Figure 9:
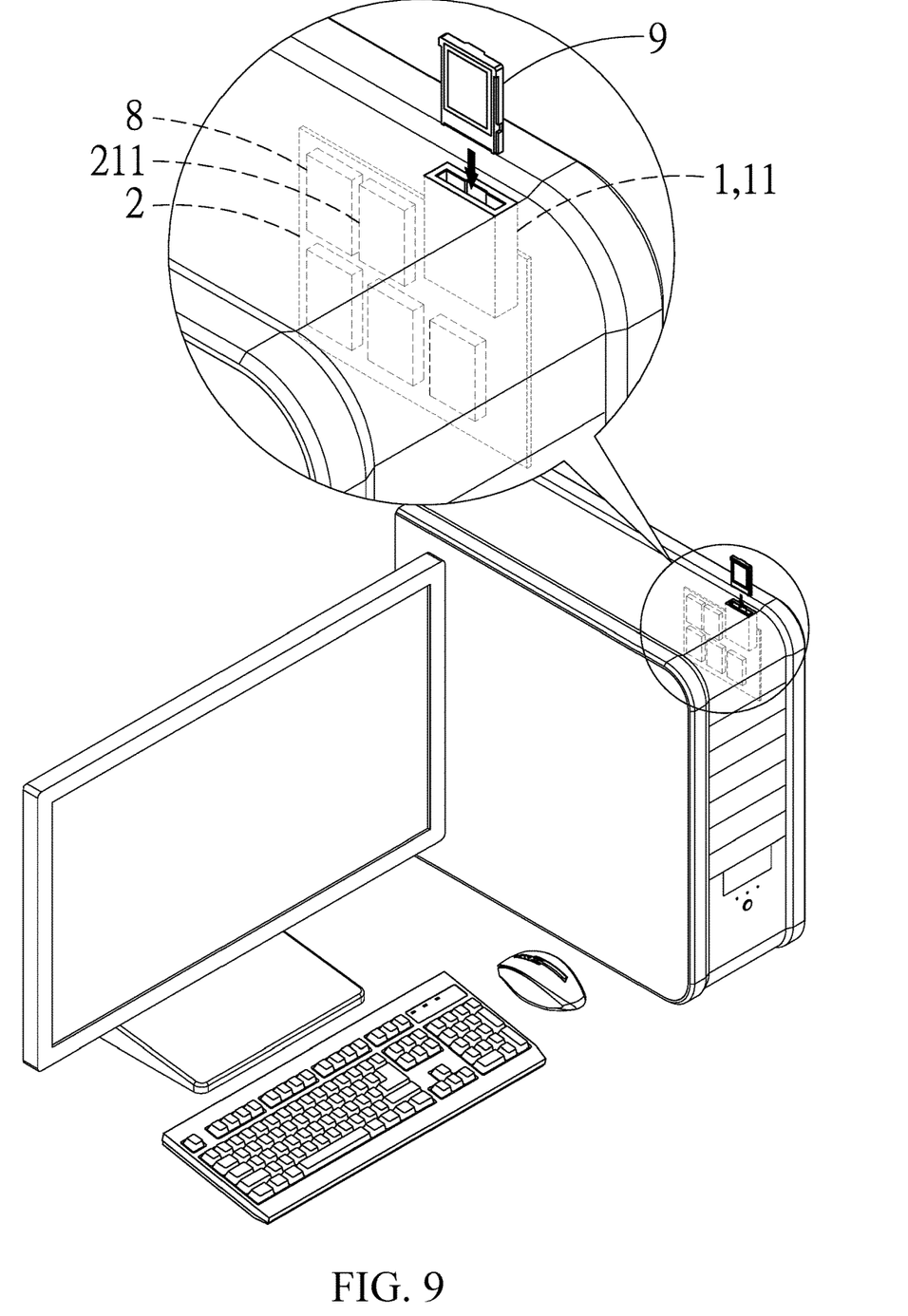
FIG. 9 is a second schematic view showing implementation of said further preferred embodiment of the present invention.

Referring to FIGS. 8 and 9, which are first and second schematic views of implementation of a further preferred embodiment of the present invention, it is clearly seen from the drawings that the instant embodiment is similar to the previous embodiments and in the instant embodiment, the swapping device 9 is a memory card, and the connector 1 is integrated with the PCIe 11 as a united structure, which is a memory card receptacle meeting the specification of Compact Flash Express (CFExpress). The high-speed transmission interface can be regarded as pins of the memory card receptacle. The memory cared receptacle is combined with a middle-to small-sized mobile device, such as a notebook computer, a digital camera, and a TV box. This provides that the hot-swappable structure of the present invention has a wide range of application. Further, on one side of the control system 2, a power control module 8 is arranged to reduce power supply to the connector 1 when the swapping detection module 211 generates a removing signal. The operation is Step (k), meaning this is performed after the steps of (a) arranging a connector, (b) arranging a chip database, (c) plugging a swapping device, (d) detecting a swapping operation, (e) reading the electrical signal, (f) comparing the electrical signal, (g) generating a control signal meeting a format, (h) generating a universal signal of a universal format, (i) issuing a resetting request, and (j) making selection among hot-swapping control modules. For example, the power of the connector 1 in a working state is 2.5 w-15 w, and when the swapping device 9 is removed, the power is reduced to lower than 0.05 w, so that the connector 1 can have a rest in a non-working state and also the device that it is set in can save electrical power.

Figure 10:
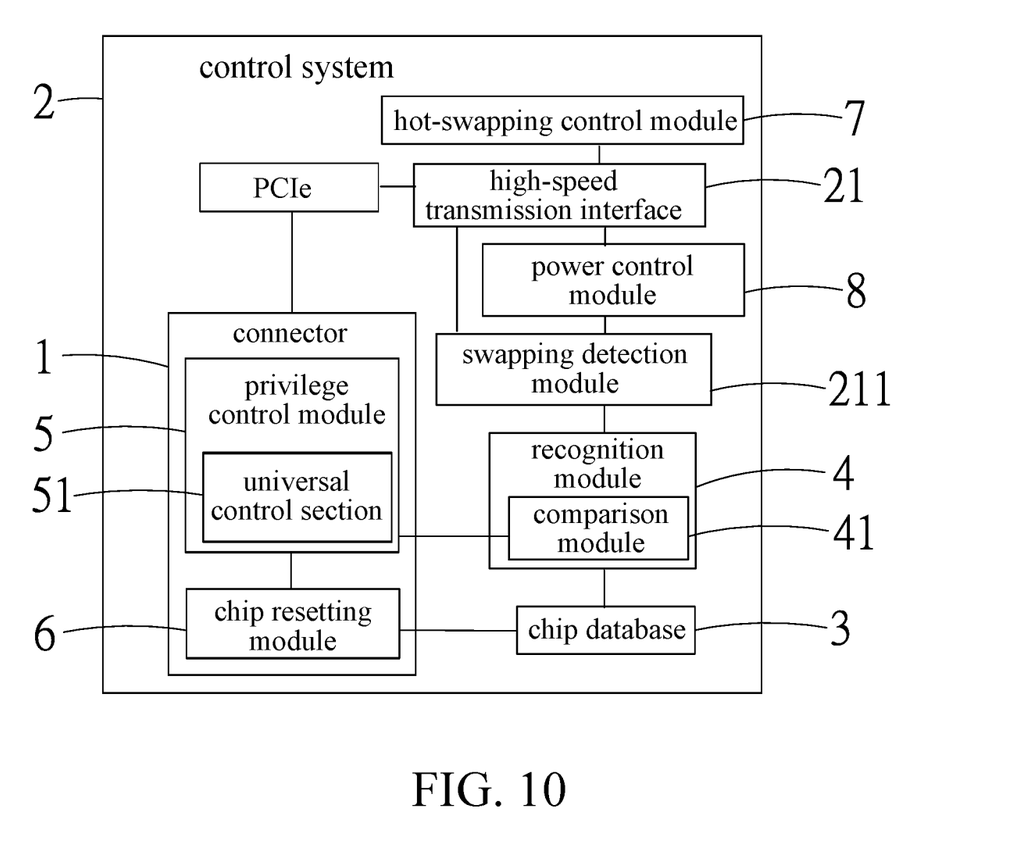
FIG. 10 is a structure block diagram of yet a further preferred embodiment of the present invention.
Figure 11:
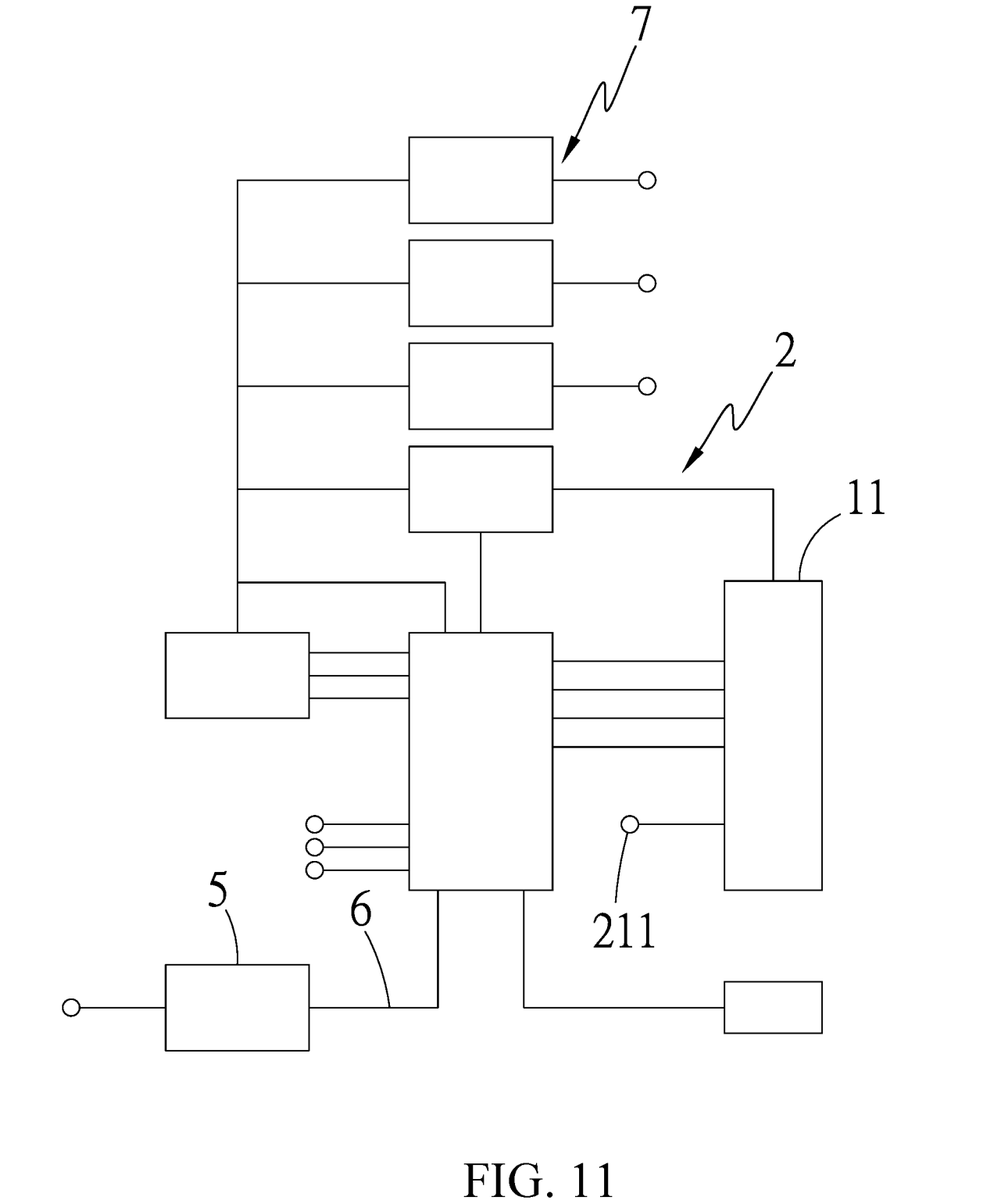
FIG. 11 is a schematic circuit diagram of said yet a further preferred embodiment of the present invention.

Referring to FIGS. 10 and 11, which are a structure block diagram and a schematic circuit diagram of yet a further preferred embodiment of the present invention, it is clearly seen from the drawings that the instant embodiment is similar to the previous embodiments and in the instant embodiment, the hot-swappable structure is a circuit board integrated with the control system 2, wherein the privilege control module 5, the universal control section 51, and the chip resetting module 6 are arranged in the connector 1, and the connector 1 is similarly integrated with the PCIe 11, and the connector 1 itself, and the remaining ones of the chip database 3, the swapping detection module 211, the recognition module 4, the comparison module 41, the hot-swapping control modules 7, the power control module 8, and the high-speed transmission interface 21 are all arranged on the circuit board on which the control system 2 is arranged to further reduce the size and fabrication cost of the connector 1, and the circuit board on which the control system 2 is arranged is larger than the circuit board in the connector 1 and thus, may be provided with more sets of hot-swapping control module 7 thereon to fit for more swapping devices of different specifications.

I claim:

1. A hot-swappable structure of a connector, the connector being connectable with a high-speed transmission interface, the connector being provided with Peripheral Component Interconnect Express (PCIe) in connection with the connector and generating an electrical signal upon connecting with a swapping device, the hot-swappable structure comprising:
   a chip database, which is arranged at one side of the high-speed transmission interface and is operable to store positive/negative trigger data, delay interval length data, and a universal delay time data corresponding to a specification of the swapping device;
   a swapping detection module, which is arranged at one side of the high-speed transmission interface and is operable to detect a swapping operation of the swapping device with respect to the PCIe to generate a plugging signal;
   a recognition module, which is in electrical connection with the swapping detection module and the chip database and is operable to read the electrical signal upon receiving the plugging signal;
   a comparison module, which is arranged in the recognition module and is operable to compare the electrical signal with the positive/negative trigger data;
   a privilege control module, which is arranged in the connector and is in electrical connection with the comparison module and the chip database, and is operable to generate a control signal that includes the plugging signal and the delay interval length data when a comparison result of the comparison module is "matched";
   a universal control section, which is arranged in the privilege control module and is operable to generate a universal signal that includes the plugging signal and the universal delay time data when the comparison result of the comparison module is "not matched";
   a chip resetting module, which is arranged at one side of the privilege control module and is in connection with a control system, and is operable to issue a resetting request that includes the control signal or the universal signal to the control system upon receiving the control signal or the universal signal; and
   a plurality of hot-swapping control modules, which are arranged at one side of the high-speed transmission interface and are in connection with the chip resetting module, wherein the control system selects, according to the resetting request, one of hot-swapping control modules to be conducting with the high-speed transmission interface.

2. The hot-swappable structure of the connector according to claim 1, wherein a power control module is arranged at one side of the control system and is operable to reduce power supply to the high-speed transmission interface when the swapping detection module generates a removing signal.

3. The hot-swappable structure of the connector according to claim 1, wherein the swapping device comprises a solid state drive (SSD).

4. The hot-swappable structure of the connector according to claim 1, wherein the swapping device comprises a memory card, and the connector is integrated with the PCIe and comprises a memory card receptacle of Compact Flash Express (CF Express).

5. The hot-swappable structure of the connector according to claim 1, wherein the hot-swappable structure comprises one of a circuit board integrated with the control system and an external connection box connected with the connector.

6. The hot-swappable structure of the connector according to claim 1, wherein the connector of is one of USB4 and Thunderbolt.

7. The hot-swappable structure of the connector according to claim 1, wherein the delay interval length data is 0 ms to 500 ms, and the universal delay time data is 1 second to 2 seconds.

8. A hot-swapping method of a connector, the connector being provided with Peripheral Component Interconnect Express (PCIe) in connection with the connector, the hot-swapping method comprising the following steps:
   (a) connecting the connector with a high-speed transmission interface;
   (b) storing positive/negative trigger data, delay interval length data, and universal delay time data corresponding to specifications of a plurality of swapping devices in a chip database arranged at one side of the high-speed transmission interface;

(c) a user connecting one of the swapping devices with the PCIe and generating an electrical signal;

(d) a swapping detection module detecting a swapping operation of the swapping device with respect to the PCIe and generating a plugging signal;

(e) a recognition module reading the electrical signal when the recognition module receives the plugging signal;

(f) a comparison module in the recognition module comparing the electrical signal with the positive/negative trigger data, and going on to Step (g) when a comparison result is "matched", and going on to Step (h) when the comparison result is "not matched";

(g) a privilege control module generating a control signal that includes the plugging signal and the delay interval length data, and going on to Step (i);

(h) a universal control section arranged in the privilege control module generating a universal signal that includes the plugging signal and the universal delay time data;

(i) a chip resetting module receiving the control signal or the universal signal and issuing a resetting request that includes the control signal or the universal signal to a control system; and (j) the control system selecting, according to the resetting request, one of the plurality of hot-swapping control modules that meets the specification of the swapping device to be conducting with the high-speed transmission interface.

9. The ot-swapping method of the connector according to claim 8,
wherein after Step (j), Step (k) is implemented in which a power control module arranged at one side of the control system is operable to reduce power supply to the high-speed transmission interface when the swapping detection module generates a removing signal.

10. The hot-swapping method of the connector according to claim 8, wherein the swapping device comprises a solid state drive (SSD).

11. The hot-swapping method of the connector according to claim 8, wherein the swapping device comprises a memory card, and the connector is integrated with the PCIe and comprises a memory card receptacle of Compact Flash Express (CF Express).

12. The hot-swapping method of the connector according to claim 8, wherein the chip database, the swapping detection module, the recognition module, the privilege control module, the chip resetting module, and the hot-swapping control modules are integrated with a circuit board of the control system.

13. The hot-swapping method of the connector according to claim 8, wherein the recognition module, the privilege control module, and the chip resetting module are integrated in an external connection box of the connector, and the chip database, the swapping detection module, and the hot-swapping control modules are integrated in a circuit board of the control system.

14. The hot-swapping method of the connector according to claim 8, wherein the connector is one of USB4 and Thunderbolt.

15. The hot-swapping method of the connector according to claim 8, wherein the delay interval length data is 0 ms to 500 ms, and the universal delay time data is 1 second to 2 seconds.

* * * * *